Figure 1:
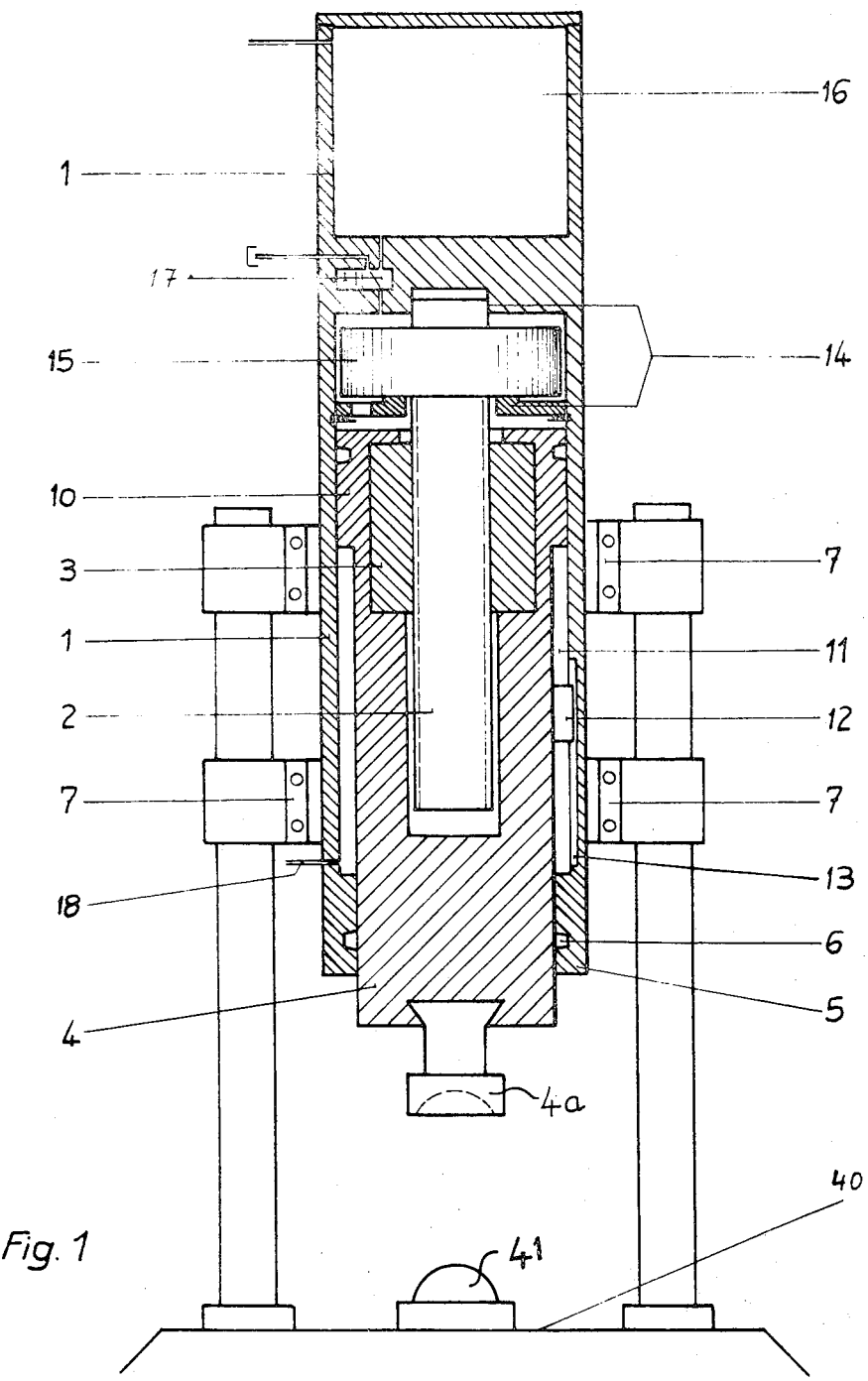

United States Patent

Dischler

[15] 3,687,070
[45] Aug. 29, 1972

[54] PRESS ASSEMBLY

[72] Inventor: Helmut Dischler, am Kreuzfeld, Germany

[73] Assignee: Becorit Grubenanskan GmbH, Recklinghausen, Germany

[22] Filed: Feb. 20, 1970

[21] Appl. No.: 13,102

[30] Foreign Application Priority Data

March 1, 1969 Germany..........P 19 10 508.9

[52] U.S. Cl. ......................100/271, 72/454, 100/289
[51] Int. Cl. ..............................................B30b 1/18
[58] Field of Search ........100/270, 271, 289; 72/435, 72/453, 454; 92/165

[56] References Cited

UNITED STATES PATENTS

| | | | |
|---|---|---|---|
| 3,020,833 | 2/1962 | Keilholz et al. | 100/271 |
| 2,635,490 | 4/1953 | Kinker | 100/271 |
| 3,507,143 | 4/1970 | Georg | 100/270 X |
| 3,313,215 | 4/1967 | Bieri | 92/165 X |
| 3,035,514 | 5/1962 | Harvanek | 100/289 X |
| 3,426,574 | 2/1969 | Voronak | 100/289 X |
| 3,512,476 | 5/1970 | Georg | 100/270 |

*Primary Examiner*—Billy J. Wilhite
*Assistant Examiner*—Philip R. Coe
*Attorney*—Berman, Davidson and Berman

[57] ABSTRACT

A press of the type wherein energy is stored in a rotating fly-wheel during the working stroke and released at the end of the stroke to perform work on a workpiece has a cylindrical housing acting as a drive cylinder for the press and also as a guide for a support adapted to carry a movable press tool. A nut and screwed spindle cause rotation of the fly-wheel and this nut and screwed spindle are also in the housing. The press is pneumatically operated for preference, with the return stroke by spring and/or pneumatic means. The support guide has a sealing ring which seals an annular lubricating oil chamber between the housing and the support. An oil mist can be injected into the compressed air used for the drive cylinder. The invention is particularly concerned with the operating assembly for the press which is a sealed well lubricated unit which can be attached to a variety of base assemblies to form different forms of presses.

10 Claims, 2 Drawing Figures

PATENTED AUG 29 1972

3,687,070

SHEET 1 OF 2

INVENTOR:
HELMUT DISCHLER,
BY
Berman, Davidson & Berman,
ATTORNEYS.

PRESS ASSEMBLY

The invention concerns an assembly for use in a press to carry a movable press tool for movement relative to a fixed tool.

In particular the invention relates to a press assembly in which the movable press tool is to be mounted on a support in the form of say a spindle.

In some presses an axially guided movable tool support and a screwed spindle rotatably or rigidly connected thereto, are hydraulically driven during a working stroke. Due to the resultant relative displacement between the screwed spindle and a nut, said spindle and/or the nut are rapidly rotated and store rotational energy. In order to store as much rotational energy as possible the spindle and/or the nut have the maximum possible moment of inertia or are connected to rotating fly-wheel masses. When the upper tool comes into contact with the workpieces, the relative movement between the spindle and the nut and, consequently, their movement of rotation also are simultaneously checked, whilst the rotational energy stored in the rotating parts is converted into translatory energy available for work on the workpiece.

With such presses it is known to guide the axially displaceable tool support (which is usually the upper of two supports the lower of which is fixed) in a cylindrical slide guide. This has certain advantages in respect of stable and reliable guidance and lubrication. These conventional presses have a frame on which the axially fixed nut or spindle is journalled and to which the said cylindrical slide guide is also connected. In addition, hydraulic cylinders for driving the movable tool support are secured to the frame.

It is an object of the invention substantially to improve the construction of a press of this type and provide a compact inexpensive construction capable of a wide range of uses.

The present invention provides a press assembly for mounting a movable press tool support for movement relative to a fixed tool support comprising:

a housing having a cylinder portion in which a piston can be moved, the movable press tool support journalled for sliding movement in the housing, the piston for sliding in said housing and imparting drive to said movable support, a screwed spindle, a nut engaged with said spindle, means for exerting pressure on said piston, and means for returning said piston when said pressure is removed.

the arrangement being such that one of said spindle and the nut is movable with the support and the other is axially immovable, at least one of said spindle and nut being rotatable so that movement of the support causes the said at least one to rotate to store kinetic energy which is available for work on the work piece, the improvement residing in that the housing serves as a sliding bearing for the movable press tool support as well as a cylinder for said piston.

Due to the fact that a single cylindrical housing in the press assembly of the present invention, serves as a guide for longitudinally displaceable parts and as a hydraulic drive cylinder and can also enclose the spindle and the nut, the entire construction of the press assembly is appreciably simplified and therefore the manufacturing costs reduced. Furthermore, the entire assembly has a closed and compact construction, so that it has a universal application and may be mass-produced. The assembly of the present invention, may be used for example in all cases where hitherto, owing to its convenient design, press tools were designed solely as compressed air or hydraulic cylinders. Compared with these, the assembly of the present invention has the advantage that it can produce much higher pressure with a considerably smaller power due to the stored rotational energy. Furthermore, the closed construction simplifies the lubrication of moving parts and makes it resistant to external influences such as dust, atmospheric conditions and the like.

In one embodiment of the present invention, the spindle is rotatable but axially immovable. The tool support is constructed as a piston and has an inner axially extending recess in which the nut is provided. This first embodiment results in a low height.

In a second embodiment of the press, the nut is rotatable but axially immovable. However, the spindle is connected at one end to the movable tool support and, at the other end, to the piston. In this embodiment the spindle serves as a piston rod and as a connecting member between the piston and the tool support.

Special advantages are obtained if compressed air is used as pressure medium, since compressed air can be easily stored in an associated pressure store, can contain atomized oil (oil mist) for lubrication and can be discharged into the atmosphere after each working stroke of the piston, without needing a separate return system. Consequently, a press operated by compressed air is more durable with a greater number of operations possible between maintenance.

The tool support is preferably guided in a cylindrical slide guide where it projects from the cylindrical housing. Due to the arrangement of the slide guide of the upper tool in this position, very accurate guiding is ensured, extending into the immediate vicinity of the workpiece to be processed. This slide guide is also provided with a sealing ring to make it possible to fill the inner space of the cylindrical housing at least partly with oil thus ensuring perfect lubrication.

The upper tool support may be connected to a return spring supported in the cylindrical housing. This spring is preferably arranged in the annular space between the wall of the cylindrical housing and a cylindrical upper tool support. However, the pressure medium may act on both ends of the piston for the same purpose. For longitudinally guiding and to prevent rotation of the longitudinally displaceable parts in the cylindrical housing, the inner circumference of the cylindrical housing is provided with grooves or springs the length of which corresponds to the length of the working stroke and on which the upper tool support is guided. Such grooves or springs may be distributed in any desired number over the circumference so that in any case exact longitudinal guidance is ensured, even in the event of eccentric loading.

The outer circumference of the cylindrical housing is preferably provided with brackets for connection with a press base or lower tool support. These brackets are arranged as far as possible in the same manner on the various types of presses and have the same kinds of dimensions so that it is possible to use the assembly on different bases for different operations.

Two embodiments of screw presses according to the present invention will be described in greater detail hereinafter with reference to the accompanying drawings.

Figure 2:
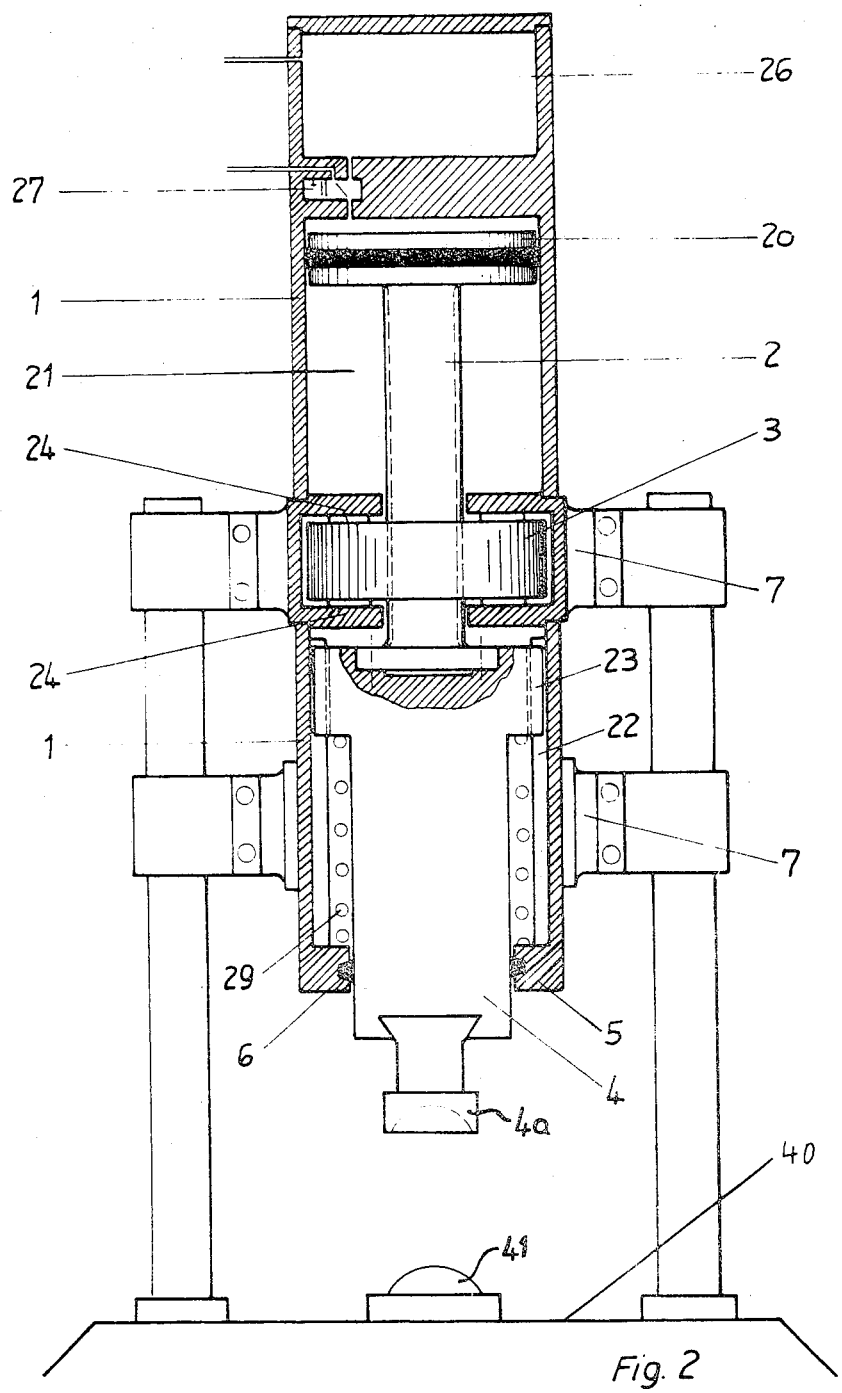

In the drawings:

FIG. 1 is a longitudinal section through a first embodiment of the press, in which the longitudinally displaceable nut is connected to a drive piston, and FIG. 2 is a longitudinal section through a second embodiment of the press, in which a longitudinally displaceable screwed spindle is connected to a drive piston.

In the description of the embodiments the corresponding parts are provided with the same reference numerals. Thus, in FIGS. 1 and 2, the press top assembly forms an interchangeable unit, which is connected by a corresponding connecting device to a lower tool support 40 for a lower fixed tool 41. The main components of the press top assemblies shown in FIGS. 1 and 2 are a cylindrical housing 1 in which a screwed spindle 2 and a nut 3 are provided. The screwed spindle 2 is provided on its outer circumference with a steep thread (not shown) engaging in a corresponding thread on the inner circumference of the bore of the nut 3. In addition, a longitudinally displaceable upper tool support 4 for a movable press tool 4a is arranged in the spindle-shaped housing 1 and guided in a slide guide 5 at the lower end of the cylindrical housing 1, said guide 5 being provided with a sealing ring 6 which seals the inside surface of the cylindrical housing 1 to the upper tool support 4 to define an oil retaining space in the annulus between the support 4 and the housing 1. Several symmetrical brackets 7 are provided on the outer circumference of the cylindrical housing 1 and serve to secure the press top assembly to a schematically illustrated construction which may be of any desired shape and connects the press top to the lower tool support 40.

The two embodiments shown in FIGS. 1 and 2 of the screw press according to the invention differ by the mounting of the screwed spindle 2 and the nut 3, as also by the different connection between the screwed spindle 2, the nut 3 and the upper tool support 4.

In the embodiment shown in FIG. 1, the nut 3 is connected axially immovable, but rotatable, relative to a piston 10 which is longitudinally displaceable with a sealing effect in a hydraulic cylinder part 11 of the cylindrical housing 1. The upper tool support 4 is connected to form a unit with the piston 10. For preventing rotation of the upper tool support 4 of and the nut 3 connected therewith, one or more sliding keys in the form of springs 12 are used, arranged on the outer circumference of the upper tool support 4 and are longitudinally displaceable in grooves 13 formed on the inner circumference of the cylindrical housing 1 and the length of which corresponds to the length of the working stroke. The screwed spindle 2 of the embodiment of the press, shown in FIG. 1, is axially undisplaceably journalled in a bearing 14 rigidly connected to the housing 1, so as to freely rotate and is connected at its upper end to a rotating working load that is a fly-wheel or other inertial energy store 15. A pressure chamber 16 for pressure medium is provided at the upper end of the cylindrical housing 1. Provided between the pressure chamber 16 and the part of the cylindrical housing 1 in which the fly-wheel 15 is provided, a valve 17 is arranged which regulates the supply and removal of pressure medium and through which this chamber may communicate either with the pressure chamber 16 or with the atmosphere. The part of the cylindrical housing 1, containing the fly-wheel 15 is connected pressure-conductively to the part 11 of the cylindrical housing formed as a hydraulic cylinder so that the upwardly pointing annular surface of the piston 10 is acted on by pressure medium when said pressure medium is supplied through the valve 17. The interposition of the part of the cylindrical housing 1, containing the fly-wheel 15 makes it possible for the bearing 14 of the spindle to be surrounded by pressure medium so that good and continuous lubrication of the bearing 14 is ensured, for example, by the addition of oil to the compressed air serving as pressure medium. A pressure medium duct 18, through which the lower annular surface of the piston 10 can be actuated, may be connected to the annular space between the cylindrical housing 1 and the likewise cylindrical upper tool support 4.

The operation of the screw press shown in FIG. 1 is as follows:

The piston 10, together with the nut 3, is moved downwardly by the pressure medium. The screwed spindle 2 and the working load 15 connected therewith are set rapidly rotating until the upper tool secured to the upper tool support 4 comes into contact with the workpiece. This stops the longitudinal movement of the upper tool support 4 and the nut 3 connected therewith, as also that of the piston 10. As a consequence of the rotational energy stored in the fly-wheel 15, the screwed spindle 2 exerts a powerful impact on the upper tool support 4 by way of the nut 3 in the direction of movement of the upper tool support 4, the piston 10 is loaded with pressure medium from the other side through the pressure medium line 18.

During the return the pressure medium chamber above the piston 10 is connected to the atmosphere by the reversing of the valve 17.

In the embodiment of the press according to the present invention, shown in FIG. 2, the screwed spindle 2 is rigidly connected at its upper end to a piston 20 which is longitudinally guided with a sealing effect in a portion 21 of the housing 1 serving as a hydraulic cylinder, whilst it is rigidly connected at its lower end to an upper tool support 4. The upper tool support 4 is again longitudinally guided by way of sliding keeps in the form of springs 22 in grooves 23, as described with reference to FIG. 1, said grooves 23 being formed on the inner circumference of the housing 1. The nut 3 in this embodiment is longitudinally immovable in a bearing 24 between the piston 20 and the upper tool carrier 4 but freely rotatable. The nut 3 is sufficiently heavy to serve simultaneously as a working load. At the upper end of the cylindrical housing 1 a pressure storage chamber 26 is provided in this embodiment also and communicates with the pressure chamber above the piston 20 through a control valve 27. For returning the longitudinally displaceable parts a spring 29 is provided in this embodiment and is arranged on the housing 1 level with the slide guide 5, on the one hand, and on the upper tool carrier 4, on the other hand and is provided in the annular chamber between the inner housing wall and the cylindrical upper tool support. Naturally, the pressure chamber below the piston 20 could also be loaded with pressure medium in this embodiment.

To operate the press according to this embodiment, the piston 20 is supplied with pressure medium by corresponding actuation of the valve 27, so that the piston 20 and the spindle 2 connected therewith, as also the upper tool support 4, firmly connected to the spindle, execute a downward movement, the longitudinally undisplaceably journalled nut 3 executing a rapid rotation and storing rotational energy until the upper tool secured to the upper tool support 4 comes into contact with the workpiece. Due to the subsequent sudden braking of the rotation of the nut, 3 a powerful axial impact is caused again which is transmitted in this case through the spindle 2 to the upper tool support 4.

I claim:-

1. A press assembly for mounting a movable press tool support for movement relative to a fixed tool support comprising, a vertically elongate housing having an axially extending bore open at the bottom and having a cylinder portion in which a piston can be moved vertically, the movable press tool support journalled for vertical sliding movement in the lower end of said bore and projecting therefrom, the piston connected to said movable press tool support for sliding in said housing and imparting drive to the movable press tool support, a vertical screwed spindle within the bore, a nut also within the bore and engaged with said spindle, fluid pressure means for exerting pressure to cause said piston to drive said movable press tool support, and means for returning said piston when said pressure is removed, one of said spindle and the nut being movable with the movable press tool support and the other being axially immovable, at least one of said spindle and nut being rotatably mounted within the housing so that movement of the support causes the said at least one to rotate to store kinetic energy which is available for work on a work piece, the improvement residing in that the housing serves as a container for said spindle and nut and provides a sliding bearing for the movable press tool support as well as a cylinder for said piston.

2. A press tool assembly according to claim 1 wherein the returning means is a means for exerting pressure on said piston to retract said movable press tool support.

3. A press assembly according to claim 1 wherein said spindle is mounted axially immovable in said housing.

4. A press assembly according to claim 3 wherein the movable press tool support is integrally formed with said piston and houses the nut therein.

5. A press assembly according to claim 4 wherein the nut is rotatable in said movable press tool support.

6. A press assembly according to claim 1 wherein said housing has a cylindrical guide in which the movable tool support slides where it projects from the housing.

7. A press assembly according to claim 6 wherein the guide includes a sealing ring and a space for lubricating oil is defined between the housing and the movable press tool support, which space is sealed by said sealing ring.

8. A press assembly according to claim 1 wherein the pressure exerting means is a compressed air connection.

9. A press tool assembly according to claim 1 wherein the housing has internal grooves and wherein the movable press tool support has keys for sliding in said grooves to guide, and prevent rotation of, the movable tool support, said grooves extending the length of the working stroke.

10. A press tool assembly according to claim 1 having mounting brackets whereby the assembly can be connected to a base to form a press.

* * * * *